United States Patent
Barton et al.

(10) Patent No.: US 9,494,139 B2
(45) Date of Patent: Nov. 15, 2016

(54) SYSTEM AND METHOD FOR CONTROLLING A POWER OUTPUT OF A WIND TURBINE GENERATOR

(71) Applicant: General Electric Company, Schenectady, NY (US)

(72) Inventors: Werner Gerhard Barton, Gescher (DE); Carsten Junge, Rheine (DE); Stephan Wachtel, Hamburg (DE); Michael Ginzburg, Dinslaken (DE)

(73) Assignee: GENERAL ELECTRIC COMPANY, Schenectady, NY (US)

(*) Notice: Subject to any disclaimer, the term of this patent is extended or adjusted under 35 U.S.C. 154(b) by 56 days.

(21) Appl. No.: 14/447,939

(22) Filed: Jul. 31, 2014

(65) Prior Publication Data

US 2016/0032896 A1 Feb. 4, 2016

(51) Int. Cl.
*F03D 9/00* (2016.01)
*H02P 9/04* (2006.01)
*H02J 3/38* (2006.01)
*G05F 5/00* (2006.01)

(52) U.S. Cl.
CPC ............... *F03D 9/003* (2013.01); *H02J 3/386* (2013.01); *Y02E 10/763* (2013.01)

(58) Field of Classification Search
USPC .................................. 290/44, 55; 323/211
See application file for complete search history.

(56) References Cited

U.S. PATENT DOCUMENTS

| | | | |
|---|---|---|---|
| 3,643,154 A * | 2/1972 | Van Riemsdijk | H01H 9/0005 200/11 TC |
| 3,691,495 A * | 9/1972 | Conway | H01F 29/02 323/255 |
| 3,818,402 A * | 6/1974 | Golaski | H01F 29/02 323/255 |
| 5,119,012 A * | 6/1992 | Okamura | G05F 1/45 323/258 |
| 5,283,728 A * | 2/1994 | Hobart | G05F 1/14 323/340 |
| 5,541,498 A | 7/1996 | Beckwith | |
| 5,726,561 A * | 3/1998 | Ghosh | H02M 1/10 323/255 |
| 6,108,226 A * | 8/2000 | Ghosh | H02J 3/24 323/255 |
| 6,118,678 A * | 9/2000 | Limpaecher | H02M 5/4505 307/109 |
| 6,492,801 B1 | 12/2002 | Sims et al. | |
| 7,402,983 B2 * | 7/2008 | Jacobson, Jr. | H02M 7/4826 307/109 |
| 7,659,700 B2 * | 2/2010 | Holveck | H02M 5/271 307/109 |
| 8,310,105 B2 * | 11/2012 | West | H02J 3/383 307/87 |
| 9,274,513 B2 * | 3/2016 | Bell | H02J 3/1878 |
| 9,282,383 B2 * | 3/2016 | Carr | H04Q 9/00 |
| 9,302,591 B2 * | 4/2016 | Huang | H02J 50/05 |
| 2006/0208707 A1 * | 9/2006 | Jacobson | H02M 5/271 320/166 |
| 2007/0124026 A1 * | 5/2007 | Troxell | G06Q 30/08 700/291 |

(Continued)

FOREIGN PATENT DOCUMENTS

| | | |
|---|---|---|
| EP | 2219277 A1 | 8/2010 |
| GB | 2152306 A | 7/1985 |

OTHER PUBLICATIONS

PCT Search Report and Written Opinion issued in connection with corresponding Application No. PCT/US2015/042588 on Oct. 1, 2015.

*Primary Examiner* — Pedro J Cuevas
(74) *Attorney, Agent, or Firm* — Douglas D. Zhang; GE Global Patent Operation

(57) ABSTRACT

A method for controlling the power output of a wind turbine, which includes a transformer with multiple taps, is provided. The method includes sensing a voltage of the transformer during operation of the wind turbine, determining the reactive power, and automatically maintaining a set value of the reactive power by controlling the output voltage of the transformer.

17 Claims, 6 Drawing Sheets

(56) References Cited

U.S. PATENT DOCUMENTS

| | | | |
|---|---|---|---|
| 2008/0290845 A1* | 11/2008 | Holveck | H02M 5/271 323/214 |
| 2011/0241630 A1* | 10/2011 | Ritchey | H02P 9/02 322/23 |
| 2013/0030598 A1 | 1/2013 | Milosevic et al. | |
| 2015/0188317 A1* | 7/2015 | Ritchey | H02P 9/02 307/80 |
| 2015/0293544 A1* | 10/2015 | Li | G05F 1/147 323/341 |
| 2015/0364993 A1* | 12/2015 | Wang | H05B 33/0815 323/282 |
| 2016/0041572 A1* | 2/2016 | Bell | H02J 4/00 700/291 |
| 2016/0146191 A1* | 5/2016 | Berroteran Gil | F03D 9/003 290/44 |

* cited by examiner

SYSTEM AND METHOD FOR CONTROLLING A POWER OUTPUT OF A WIND TURBINE GENERATOR

BACKGROUND OF THE INVENTION

The subject matter described herein relates generally to methods and systems for controlling a wind turbine power output, and more particularly, to methods and systems for controlling reactive power (VAR or Q) and/or phi of the wind turbine power output.

Generally, a wind turbine includes a turbine that has a rotor that includes a rotatable hub assembly having multiple blades. The blades transform wind power into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical power to electrical power, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency at which electric power is generated to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Such operation may result in inefficient wind turbine operation, and a power generation capability of the wind turbine may be underutilized.

With the growing success of wind power production in recent years, this form of power has gained significant market share in the power production of some countries, notably, for example, Germany. As wind power is not a power source having a timely constant power output, but includes variations, for example due to variations of the wind speed, operators of power distribution networks have to take this into account. One of the consequences is, for example, that the distribution and transmission networks have become more difficult to manage. This pertains also to the management of the amount of reactive power flow in a network.

BRIEF DESCRIPTION OF THE INVENTION

In one aspect, a method for controlling the power output of a wind turbine, which includes a transformer with multiple taps, is provided. The method includes sensing a voltage of the transformer during operation of the wind turbine, determining the reactive power, and maintaining a set value of the reactive power by controlling the output voltage of the transformer.

In another aspect, a method for controlling phi or a volt-ampere reactive power of a wind turbine is provided. The method includes detecting the amount of volt-ampere reactive power delivered or consumed by the wind turbine, or determining value and sign of phi, and controlling a voltage output of a transformer of the wind turbine in order to maintain a defined sign and value of phi or a defined volt-ampere reactive power.

In yet another aspect, a control system for controlling a volt ampere reactive power of a wind turbine or phi is provided. The system includes a controller, a transformer having multiple taps delivering differing voltages during operation of the transformer, and a tap changing mechanism controlled by the controller.

In yet another aspect, a wind turbine including a control system for controlling the volt ampere reactive power is provided. The wind turbine includes a tower, a nacelle, a rotor mounted to the nacelle, a generator located in the nacelle, a controller, a transformer including multiple taps providing differing voltages during operation, a tap changing mechanism controlled by the controller.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
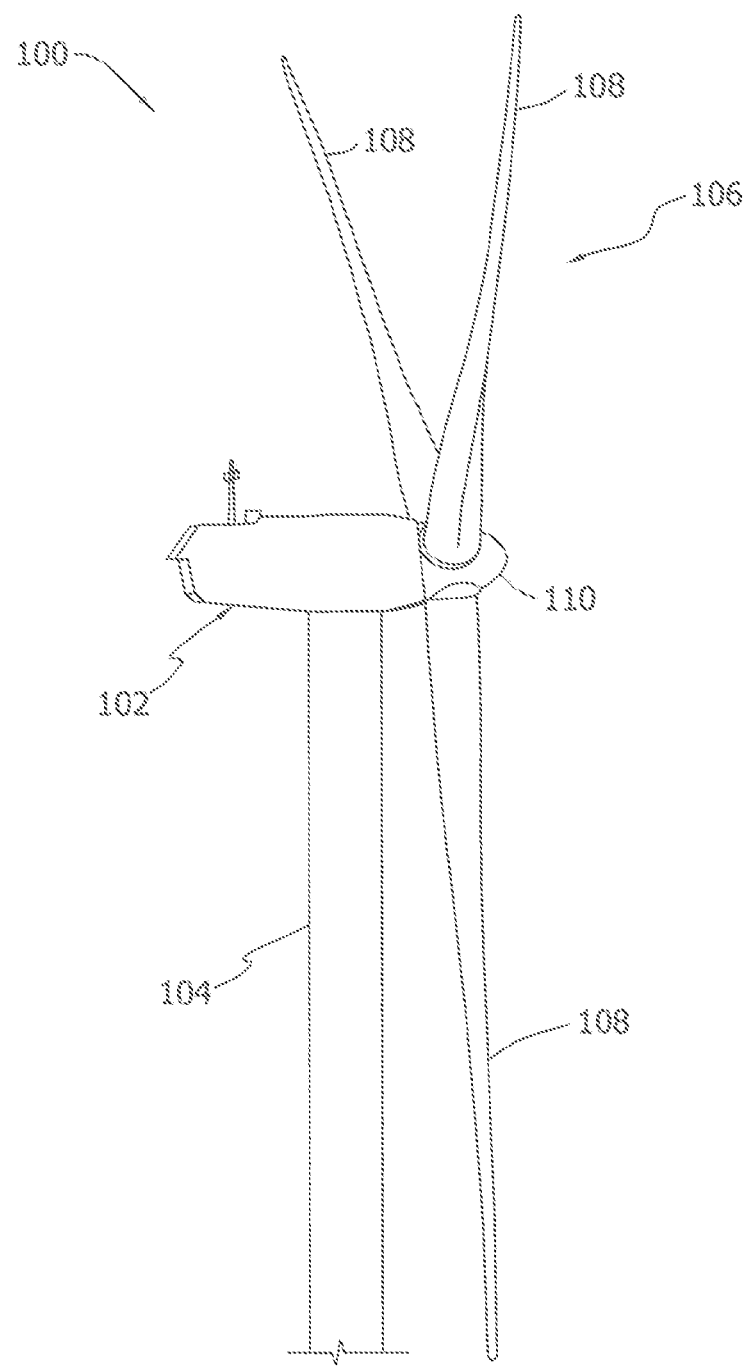
FIG. 1 is a perspective view of a portion of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that has an increased voltage operating range and a smaller utilitization of the tap changer. To optimize the required elements, the tap changer needs a specially designed control strategy. The idea is to bring the tap changer in a prefered position based on the operation mode and the operating point, and to control it based on the operation mode and condition. The mean operation mode is based on the sign of the reactive power/cos phi demand. The mean of operating point is the actual relevant voltage.

As used herein, the term "adaptive control" is intended to be representative of a control method used by a controller, wherein the controller adapts to the system it controls. In this context, typically the controlled system is a wind turbine or a subsystem thereof. Typically, values of at least some of the parameters of the controlled system used by the controller vary during operation of the controlled system. Also, boundary values of the parameters used by the controller may vary, and/or threshold values of parameters used may vary.

As used herein, the term "blade" is intended to be representative of any device that provides a reactive force when in motion relative to a surrounding fluid. As used herein, the term "wind turbine" is intended to be representative of any device that generates rotational power from wind power, and more specifically, converts kinetic power of wind into mechanical power. As used herein, the term "wind generator" is intended to be representative of any wind turbine that generates electrical power from rotational power generated from wind power, and more specifically, converts mechanical power converted from kinetic power of wind to electrical power As used herein, "sensing a voltage at a winding of the transformer of the wind turbine" is intended to be representative of sensing the voltage at a transformer tap connected to the winding, or at any position along a conductor connected to the tap.

As used herein, "phi" is intended to be representative of the phase angle between wind turbine voltage and current.

As used herein, "detecting the reactive power of a wind turbine" is intended to be representative of: detecting the amount of a volt-ampere reactive power delivered or consumed by the wind turbine, and/or determining value and sign of the phase angle between wind turbine voltage and current. As used herein, "controlling the reactive power of a wind turbine" is intended to be representative of: controlling the amount of a volt-ampere reactive power delivered or consumed by the wind turbine, and/or controlling value and sign of the phase angle between wind turbine voltage and current.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
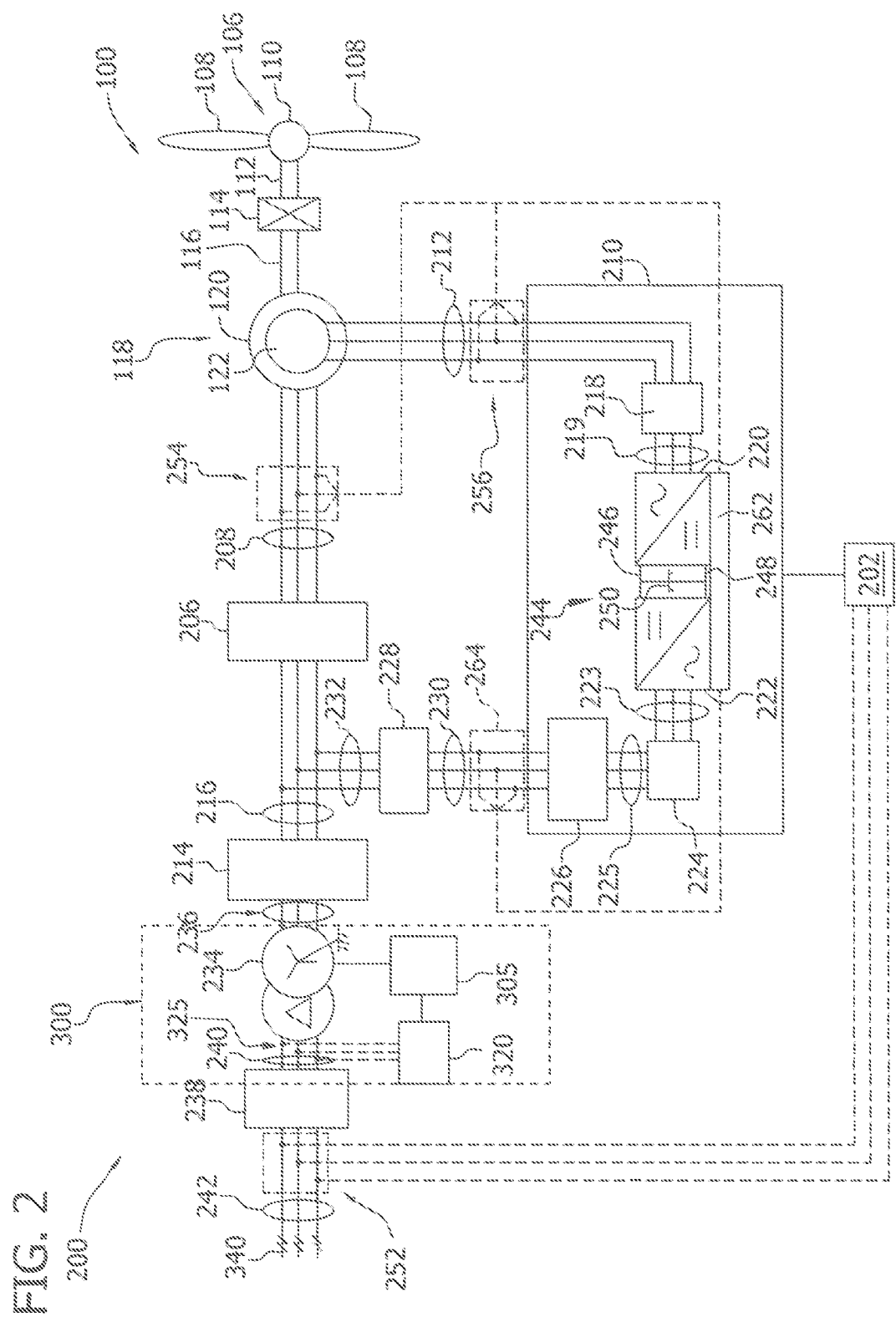
FIG. 2 is a schematic view of an exemplary electrical and control system suitable for use with the wind turbine shown in FIG. 1.

FIG. 2 is a schematic view of an exemplary electrical and control system 200 that may be used with wind turbine 100.

Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1 or different. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates transmitting electric power between generator stator 120 and an electric power transmission or distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission or distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive bus 246, a negative bus 248, and at least one capacitor 250 coupled between positive bus 246 and negative bus 248. Alternatively, capacitor 250 includes one or more capacitors configured in series and/or in parallel between positive bus 246 and negative bus 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind power into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical power to a sinusoidal, three-phase alternating current (AC) electrical power signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical rotational speed and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In embodiments as shown in FIG. 2, the wind turbine includes a system for controlling the reactive power output 300 of the wind turbine employing an on load tap changer (OLTC) 305. To this end, a transformer 234 including multiple taps 310 (not shown in FIG. 2) is employed. The on load tap changer 305 includes a tap changing mechanism, as known in the art, which is used to switch between taps 310 during operation of the wind turbine. By changing between the taps 310, which are electrically connected to the grid bus 242 via the breaker-side bus 240 and the grid circuit breaker 238, the output voltage of the transformer is altered, and thus the output voltage of the wind turbine 100, including control system 200 with the system for controlling the reactive power output 300, is altered. A tap changer controller 320 controls the operation of the on load tap changer 305. The tap changer controller 320 is adapted to determine the sign and value of phi and/or a volt-ampere reactive power (Q) via voltage and current sensors 325 on the distribution grid side of transformer 234. The tap changer controller 320 is adapted to automatically maintain a set value of phi or the volt ampere reactive power on the grid side of the transformer 234 by controlling the output voltage of the transformer 234. This means that the output voltage of the wind turbine is altered by alternating between the plurality of taps 310 on the transformer 234.

Figure 3:
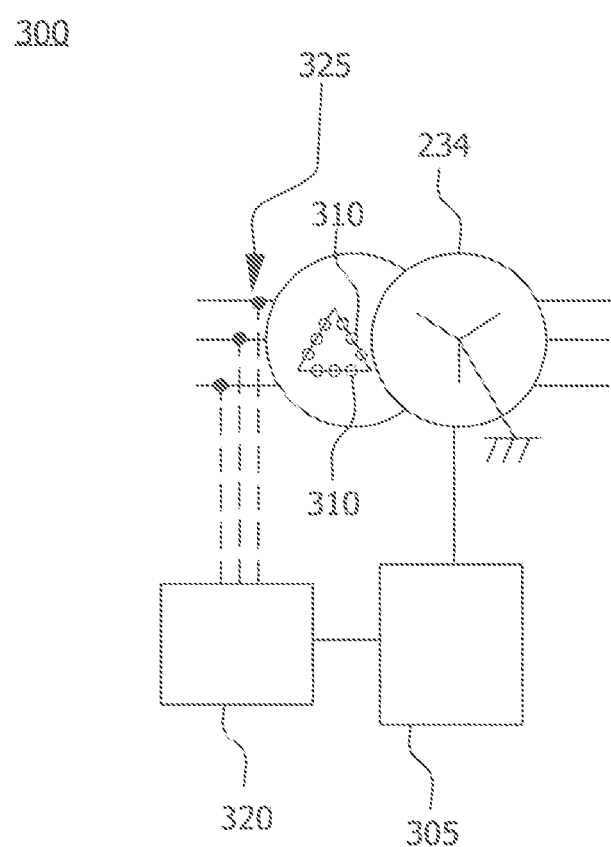
FIG. 3 is a schematic view of an exemplary system for controlling the reactive power output, according to embodiments.

In FIG. 3, the above described system for controlling the reactive power output 300 according to embodiments is shown, including the on load tap changer 305 and the tap changer controller 320. In embodiments, the tap changer controller 320 may not be a distinct system as shown, but may be integrally integrated in other systems of the control system 200 of the wind turbine, such as in turbine controller 202 (see FIG. 2) or similar systems. The system for controlling the reactive power output 300 according to embodiments comprises a transformer 234 including multiple taps 310. The on load tap changer 305 switches with its tap changing mechanism to switch between taps 310. By changing between the taps 310, which are electrically connected to the grid bus 242 via the breaker-side bus 240 and the grid circuit breaker 238, the output voltage of the transformer is altered, and thus the output voltage of the wind turbine 100, including control system 200 with the system for controlling the reactive power output 300, is altered. A tap changer controller 320 controls the operation of the on load tap changer 305. The tap changer controller 320 is adapted to determine the sign and value of phi and/or a volt-ampere reactive power (Q) via voltage and current sensors 325 on the distribution grid side of transformer 234. In embodiments, the transformer may comprise a primary, secondary and ternary winding. Consequently, the voltage may be measured at the primary, secondary or ternary winding. If the voltage is measured at a winding (respectively at the taps 310 connected to that winding) differently from the winding which is on the side of the transformer towards the distribution grid 340 via a grid bus 242 (see FIG. 2), the other two corresponding voltages may be calculated from known relations between the voltages and transformer impedance, e.g. by the tap changer controller 320.

In embodiments, the number of taps 310 employed on transformer 234 may differ from 3 to 11 taps, more typically from 5 to 9 taps. Each tap is connected to a different position of a winding of the transformer 234. This means that the transformer delivers different output voltages at different taps 310, given a constant input voltage. Thereby, the numbers of taps provided above typically refer to each phase of the transformer, that is, typically the transformer has the above described plurality of taps for each phase, wherein the tap configuration is typically identical for each of the three phases. Also, the switching mechanisms and control operations disclosed herein are typically carried out for all phases simultaneously at the same time and in the same manner, providing that all phases of the transformer operate with the same electrical characteristics. Typically, one middle or central tap is configured to deliver a typical voltage, and the adjacent or neighbouring taps deliver a decreased or increased voltage. Thereby, the typical voltage difference between the adjacent taps is from about 1% to about 3%, for example 1.5% or 2.5%. Consequently, a (non-limiting) transformer with 5 taps may exemplarily deliver 100% of the mean output voltage at the middle tap or center tap, 102.5% at the next tap, 105% at the subsequent tap, and in the other direction 97.5% and 95% of the mean voltage.

In embodiments, a control strategy for the control of the on load tap changer 305 is as follows. The preferred tap 310 of the transformer is based, as a first factor, on the actual voltage at the transformer 234. The voltage is measured via the tertiary, secondary or primary winding. As a second factor, the tap 310 depends on the sign of the reactive power/phi command set point, also called set value. The tap changer controller 320 senses the voltage at the transformer (tertiary, secondary or primary winding), and determines the sign of the reactive power/phi command set point.

In embodiments as shown in FIG. 3, the tap changer controller 320 is a two point controller with adaptive switching points for hysteresis. The adaption of the switching points is carried out using voltage thresholds for hysteresis. The switching points depend on the following cases: a) a volt-ampere reactive power (Q) is delivered from the wind turbine 100 to the distribution network 340; or b) a volt-ampere reactive power (Q) is absorbed by the wind turbine 100, and is delivered from the distribution network; or c) the wind turbine 100 is operated at a unity power factor, meaning there is no volt-ampere reactive power, neither delivered from the wind turbine 100 to the distribution grid, nor absorbed by the wind turbine 100 from the distribution grid.

The switching points, at which the tap changer controller 320 initiates a change from one tap 310 to another tap 310, are settable controller parameters for each of the three cases a), b), and c).

Figure 4:
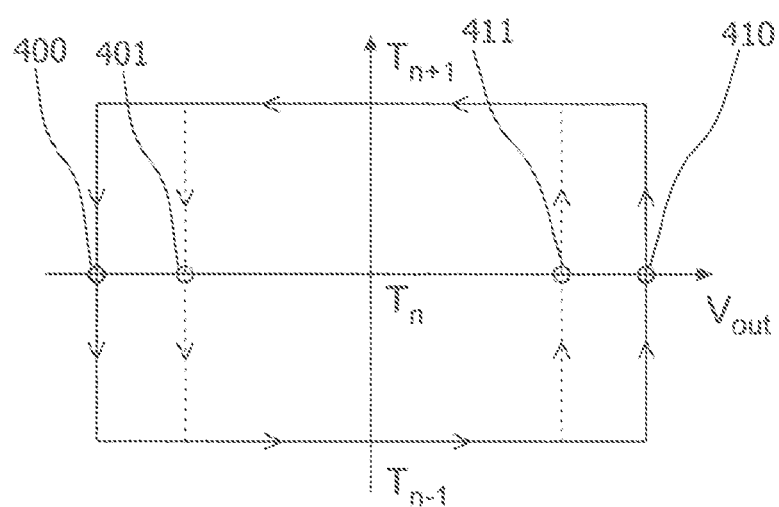
FIG. 4 is a schematic view of a diagram of the operation of a tap changer controller according to embodiments.

An exemplary switching behavior of the tap changer controller 320, being a two point controller with adaptive switching points for hysteresis, is schematically shown in FIG. 4. Therein, two first switching points 400, 410 are shown in solid lines. Two second switching points 401, 411 are shown in dashed lines. $V_{out}$ is the voltage measured by the tap changer controller 320. Depending on the measured parameters, the switching points are adapted from their first positions in the diagram (400, 410) to their second positions (401, 411). For each of the three cases a), b), and c), the switching points are settable parameters of the tap changer controller 320.

The tap changer controller 320 may in embodiments be blocked; such that it may be blocked as long as a blocking signal from the programmable logic controller (PLC) is provided. This serves, e.g., to avoid interactions when the wind turbine is undergoing voltage dips in the distribution network, or when similar fast short changes occur. For the case that a number of different taps 310 are required, a number of these on load tap changers 305 can work together as a cascade.

By operating the tap changer controller 320, in embodiments a method for controlling the power output of a wind turbine 100 comprising a transformer 234 with multiple taps 310 is employed. The method includes sensing a voltage of the transformer 234 during operation of the wind turbine 100, and determining the sign and value of phi or a volt-ampere reactive power (Q) by the tap changer controller 320. In this manner, a set value of phi or a Q value is automatically maintained by controlling the output voltage of the transformer 234, wherein the output voltage is controlled by alternating between the plurality of taps 310 on the transformer 234.

In embodiments, the tap changer controller 320 includes adaptive switching points, or the tap changer controller 320 includes adaptive switching voltages.

The tap changer controller 320 and the described methods for operating it may be employed for controlling phi, or for controlling a volt-ampere reactive power (Q) of the wind turbine 100. Typically, in embodiments, the amount of volt-ampere reactive power (Q) which is delivered or consumed by the wind turbine is determined. Alternatively or additionally, a value and sign of phi may be determined. A voltage output of the transformer 234 of the wind turbine 100 is then controlled in order to maintain a defined sign and value of phi. In embodiments, a voltage output of the transformer 234 of the wind turbine 100 may be controlled in order to maintain a defined volt-ampere reactive power (Q). The output voltage $V_{out}$ is controlled by the tap changer controller 320 which includes adaptive switching points for hysteresis. The tap changer controller 320 automatically switches between various taps 310 on the transformer 234, and wherein the switching points are adaptive.

In embodiments, a wind turbine 100 has a control system for controlling the volt ampere reactive power, the wind turbine comprising a tower 104, a nacelle 102, a rotor 106 mounted to the nacelle, a generator located in the nacelle, a controller 202, a transformer 234 including multiple taps 310 delivering differing voltages during operation, and an on load tap changer controlled by the controller.

Figure 5:
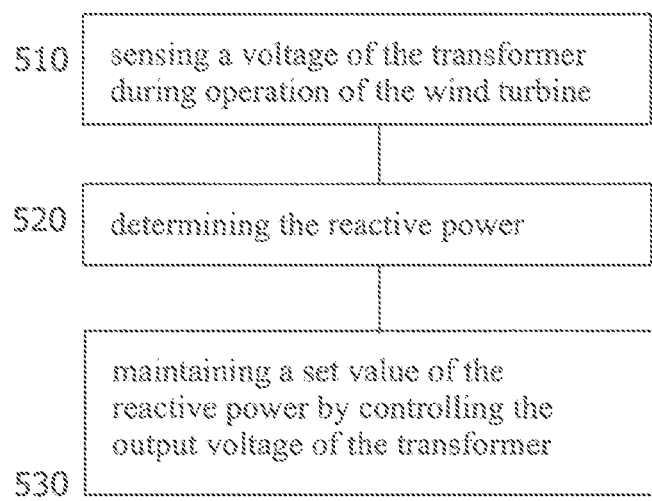
FIG. 5 is a schematic view of a method for controlling the power output of a wind turbine, which includes a transformer with multiple taps, according to embodiments.

FIG. 5 is a schematic view of a method 500 for controlling the power output of a wind turbine 100, which includes a transformer 234 with multiple taps 310, according to embodiments. The method 500 includes sensing a voltage of the transformer 234 during operation of the wind turbine 100, in a block 510; determining the reactive power in a block 520, which typically includes determining sign and value of phi or a volt-ampere reactive power Q; and, automatically maintaining a set value of the reactive power by controlling the output voltage of the transformer 234, in a block 530, which typically includes automatically maintaining phi or Q.

Figure 6:
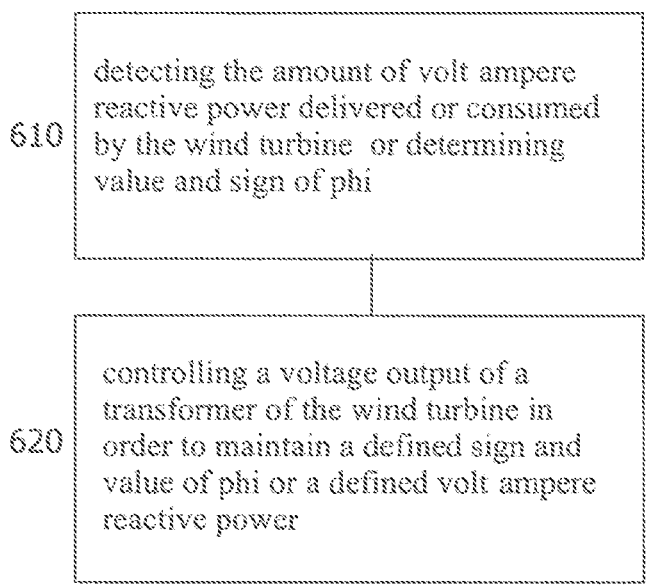
FIG. 6 is a schematic view of a method for controlling phi or a volt-ampere reactive power of a wind turbine, according to embodiments.

FIG. 6 shows a method 600 for controlling phi or a volt-ampere reactive power of a wind turbine 100. The method 600 comprises detecting the amount of a volt-ampere reactive power delivered or consumed by the wind turbine 100 or determining value and sign of phi, in a block 610; and controlling a voltage output of a transformer 234 of the wind turbine 100 in order to maintain a defined sign and value of phi or a defined volt-ampere reactive power, in a block 620.

In the methods shown in FIG. 5 and FIG. 6, a control strategy of controlling may be directed to control either sign and amount of phi, or to control the amount of volt-ampere reactive power. Both variants may be applied alternatively or in combination, the strategy chosen may, e.g., be dependent from other construction parameters of the wind turbine, properties of the power grid, or other factors.

The above-described systems and methods facilitate an adaptive switching of the output voltage of a wind turbine with an on load tap changer. As the switching behavior of the tap changer controller is adapted to operating parameters, the switching behavior may be optimized. One aspect is to reduce the average number of switching incidents per time unit. This aims to prolong the lifetime of the control system, and also the lifetime of the electrical system of the wind turbine, and thus the wind turbine itself. Further, wind turbines according to embodiments have an increased voltage range.

Exemplary embodiments of systems and methods for are described above in detail. The systems and methods are not limited to the specific embodiments described herein, but rather, components of the systems and/or steps of the methods may be utilized independently and separately from other components and/or steps described herein. For example, a method for controlling the power output of a wind turbine comprising a transformer with multiple taps is not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling the power output of a wind turbine comprising a transformer, the method including:
   a) sensing a voltage of the transformer during operation of the wind turbine, the transformer comprising a plurality of taps;
   b) determining a reactive power of the wind turbine; and
   c) maintaining a set value of the reactive power by alternating between the plurality of taps on the transformer so as to control an output voltage of the transformer.

2. The method of claim 1, wherein the alternating between the plurality of taps is carried out by a tap changing mechanism controlled by a controller.

3. The method of claim 1, wherein maintaining the set value is controlled by a controller being a two-point-controller having a hysteresis.

4. The method of claim 3, wherein the controller includes adaptive switching points and/or adaptive switching voltages.

5. The method of claim 1, wherein determining the reactive power includes at least one of: detecting the amount of a volt-ampere reactive power delivered or consumed by the wind turbine, and determining value and sign of the phase angle between wind turbine voltage and current.

6. The method of claim 1, wherein the output voltage is controlled by a controller having adaptive switching points for hysteresis, wherein the adaption of the switching points is dependent on:
   a) the delivery of a volt-ampere reactive;
   b) the absorption of a volt-ampere reactive; and,
   c) the operation of the wind turbine at a unity power factor.

7. The method of claim 1, further comprising:
   a) sensing a voltage at one or more of a primary, secondary, or tertiary winding of the transformer of the wind turbine, and
   b) calculating a non-measured voltage at a different winding based on known relations of the voltages, transformer impedance and operating points.

8. A method for controlling the reactive power of a wind turbine having a transformer with a plurality of taps, comprising:

a) detecting an amount of a volt-ampere reactive power delivered or consumed by the wind turbine, or determining a value and sign of phi; and
b) controlling an output voltage of the transformer of the wind turbine by alternating between the plurality of taps on the transformer in order to maintain a defined sign and value of phi or a defined volt-ampere reactive power.

9. The method of claim 8, wherein the output voltage of the transformer is controlled by a controller including adaptive switching points for hysteresis, wherein the controller automatically switches between the plurality of taps on the transformer, and wherein the switching points are adaptive.

10. A control system for controlling the reactive power of a wind turbine, comprising:
a) a controller;
b) a transformer comprising a plurality of taps delivering differing voltages during operation of the transformer;
c) one or more sensors configured to sense a voltage of the transformer during operation of the wind turbine; and
d) a tap changing mechanism controlled by the controller, the tap changing mechanism configured to maintain a set value of the reactive power by alternating between the plurality of taps on the transformer so as to control an output voltage of the transformer.

11. The control system of claim 10, wherein the controller determines a sign and amount of phi or a volt-ampere reactive power.

12. The control system of claim 10, wherein the controller is a two-point-controller having a hysteresis.

13. The control system of claim 10, wherein the controller has adaptive switching points.

14. The control system of claim 10, wherein the controller has adaptive switching voltages.

15. The control system of claim 10, wherein the controller has adaptive switching points for hysteresis, wherein the adaption of the switching points by the controller is dependent on at least one of:
a) delivery of volt-ampere reactive;
b) absorption of volt-ampere reactive; or
c) operation of the wind turbine at a unity power factor.

16. The control system of claim 10, wherein the voltage is sensed at one or more of a primary, secondary, or tertiary winding of the transformer of the wind turbine.

17. A wind turbine having a control system for controlling the reactive power, the wind turbine comprising:
a) a tower;
b) a nacelle;
c) a rotor mounted to the nacelle;
d) a generator located in the nacelle;
e) a controller;
f) a transformer comprising a plurality of taps delivering differing voltages during operation of the transformer;
g) one or more sensors configured to sense a voltage of the transformer during operation of the wind turbine; and
h) a tap changing mechanism controlled by the controller, the tap changing mechanism configured to maintain a set value of the reactive power by alternating between the plurality of taps on the transformer so as to control an output voltage of the transformer.

* * * * *